US011074031B1

(12) United States Patent
Leonard

(10) Patent No.: US 11,074,031 B1
(45) Date of Patent: *Jul. 27, 2021

(54) SYSTEMS AND METHODS FOR DYNAMIC AUDIO PROCESSING

(71) Applicant: Colin Leonard, Marietta, GA (US)

(72) Inventor: Colin Leonard, Marietta, GA (US)

( * ) Notice: Subject to any disclaimer, the term of this patent is extended or adjusted under 35 U.S.C. 154(b) by 646 days.

This patent is subject to a terminal disclaimer.

(21) Appl. No.: 15/257,642

(22) Filed: Sep. 6, 2016

(51) Int. Cl.
G06F 17/00 (2019.01)
G06F 3/16 (2006.01)
H04L 29/08 (2006.01)
B25J 18/00 (2006.01)

(52) U.S. Cl.
CPC .............. G06F 3/162 (2013.01); B25J 18/00 (2013.01); H04L 67/06 (2013.01)

(58) Field of Classification Search
CPC ...................................... G06F 3/162
See application file for complete search history.

(56) References Cited

U.S. PATENT DOCUMENTS

| 4,275,268 | A | 6/1981 | Takahashi |
| 4,277,796 | A | 7/1981 | Ross |
| 4,462,050 | A | 7/1984 | Cox |
| 5,325,238 | A | 6/1994 | Stebbings et al. |
| 6,584,443 | B1 | 6/2003 | Kawamura et al. |
| 7,392,101 | B2 | 6/2008 | Fujita et al. |
| 8,682,462 | B2 | 3/2014 | Leonard |
| 8,886,344 | B2 | 11/2014 | Radford et al. |
| 9,264,835 | B2 | 2/2016 | Condit et al. |
| 9,265,835 | B2 | 2/2016 | Condit et al. |
| 9,449,082 | B2 | 9/2016 | Leonard |
| 2006/0152398 | A1* | 7/2006 | Jubien ........................ G06F 3/16 341/155 |
| 2016/0336911 | A1 | 11/2016 | Leonard |
| 2017/0269898 | A1* | 9/2017 | Barrett ................... H04H 60/04 |

OTHER PUBLICATIONS

Elbin, Jesse , "NonFinal OA", U.S. Appl. 14/224,009, filed Mar. 24, 2014; dated Nov. 30, 2015.
Elbin, Jesse, "Final Office Action", U.S. Appl. No. 16/016,273; filed Jun. 22, 2018; dated Aug. 21, 2019.
Elbin, Jesse, "NonFinal OA", U.S. Appl. No. 16/016,273; filed Jun. 22, 2018; dated Apr. 12, 2019.
Elbin, Jesse, "NonFinal OA", U.S. Appl. No. 16/016,282; filed Jun. 22, 2018; dated Apr. 12, 2019.

(Continued)

Primary Examiner — Joseph Saunders, Jr.
(74) Attorney, Agent, or Firm — Philip H. Burrus, IV

(57) ABSTRACT

An audio processing system (100) includes a server complex (102) in communication with a network (103). The server complex (102) receives a digital audio file (104) and one or more analog domain control settings (111) from a client device (101) across the network. A digital-to-analog converter (118) converts the digital audio file (104) to an analog signal (119). One or more analog signal processors (105, 106) apply at least one analog modification (181) to the analog signal in accordance with the one or more analog domain control settings. An analog-to-digital converter (124) converts the modified analog signal to a modified digital audio file (125). The server complex can then deliver the modified digital audio file to the client device across the network.

20 Claims, 8 Drawing Sheets

(56) References Cited

OTHER PUBLICATIONS

Elbin, Jesse, "NonFinal Office Action", U.S. Appl. No. 16/016,273; filed Jun. 22, 2018; dated Feb. 14, 2020.
Elbin, Jesse, "Notice of Allowance", U.S. Appl. No. 15/188,795; filed Jun. 2016; dated Jun. 14, 2018.
Elbin, Jesse, "Notice of Allowance", U.S. Appl. No. 16/016,282; filed Jun. 2018; dated Sep. 10, 2019.
Houghton, Matt, "Hardware in the Software Studio—Hybrid Systems", Published May 2010, Sound On Sound, all pages.
Jackson, Roger, "Apple Logic: Back to Basics—Logic Notes", Dec. 2010, Sound on Sound, all pages.
Sage Audio, "Professional Online Mastering Mixing", Nov. 30, 2010; Sage Audio, all pages.
Solid State Logic, "SL 900J Series Total Studio System Console Operator's Manual and Computer Operator's Manual", 1994; Solid State Logic Limited, pp. 2-27 and 5-1.

* cited by examiner

SYSTEMS AND METHODS FOR DYNAMIC AUDIO PROCESSING

BACKGROUND

Technical Field

This disclosure relates generally to analog processing systems, and more particularly to analog audio processing systems.

Background Art

Audio production can include the pre-recording processing, recording, mixing, and/or post-recording processing of sound. One example of audio post processing is mastering. Mastering is the process of manipulating recorded audio into a "final mix" that sums a multi-track recording into mono, stereo, or surround sound to create a "master track" from which all commercial copies will be produced. When mastering operations are performed, signal processing operations such as corrective equalization and dynamic correction help to shape the ultimate sound of the master track. Mastered tracks have improved sound translation and increased loudness for optimal sound quality. These operations also help to ensure that the master track will express proper fidelity on a large range of audio playback systems.

Most modern mastering occurs in the digital domain. However, many artists, audiophiles, and purists prefer mastering in the analog domain due to the superior acoustic characteristics that result in the final mix. Unfortunately, analog mastering requires complex analog signal processing devices that include analog transistors or vacuum tubes that are manually adjusted by potentiometers to achieve optimum sound in a highly controlled listening environment. This does not lend itself to on-line operations. It would be advantageous to have an improved mastering system and methods that allows for analog mastering from remote locations.

Figure 1:
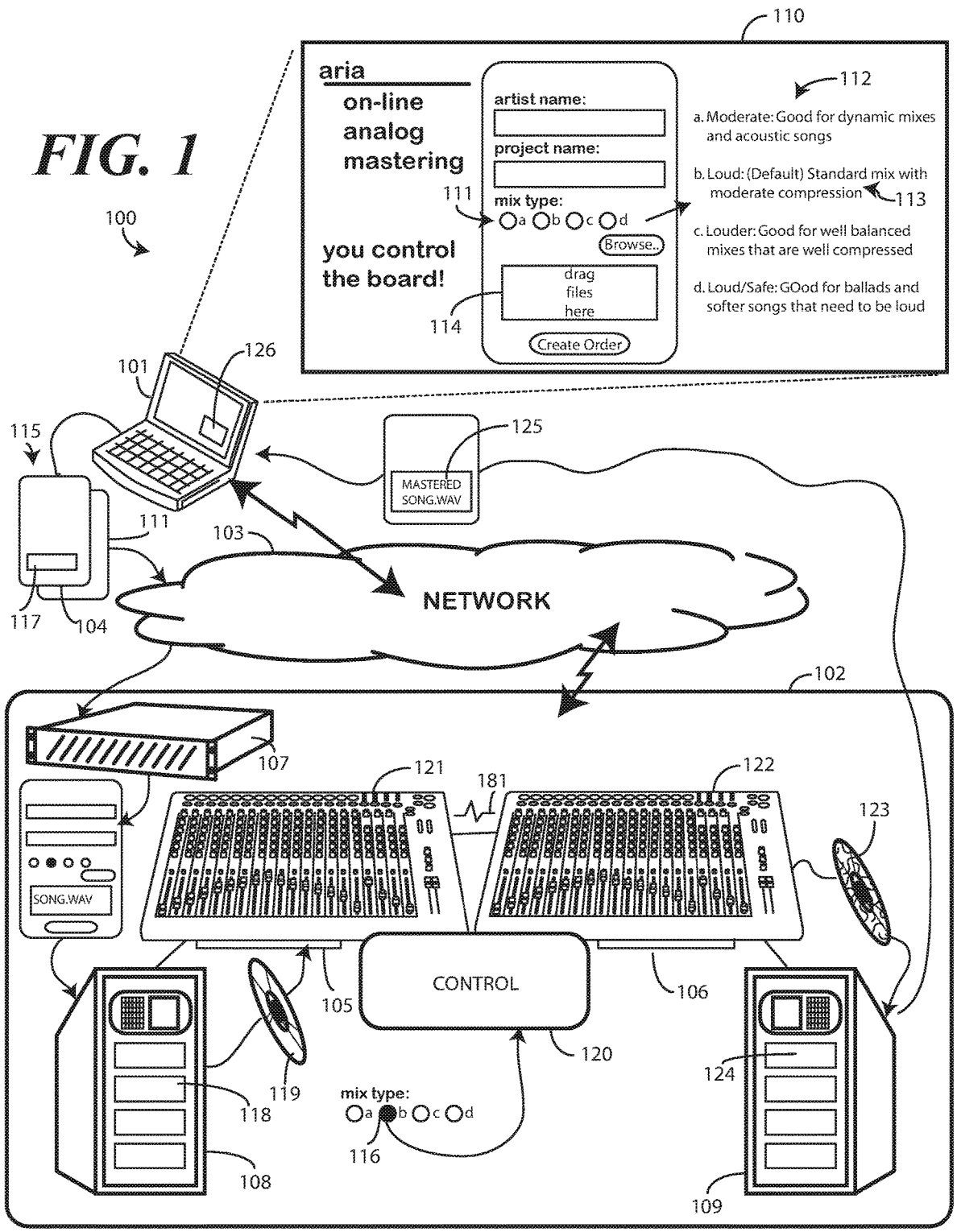
FIG. 1 illustrated one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to controlling, remotely, analog signal processors in an automated analog domain mastering system to master a digital audio file in the analog domain. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, it is expected that one of ordinary skill, notwithstanding possibly significant effort and many design choices motivated by, for example, available time, current technology, and economic considerations, when guided by the concepts and principles disclosed herein will be readily capable of generating systems and methods in accordance with the disclosure with minimal experimentation.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to analog signal processing circuits operating in tandem with a server complex, allow digital control of analog domain equipment to master digital audio files in the analog domain remotely to obtain a final mix.

The methods disclosed herein may be executed in full or in part, for example, by a processor that executes instructions stored on a non-transitory computer-readable storage medium. Similarly, a system described herein may include a processor and a memory, the memory being a non-transitory computer-readable storage medium. As used herein, a non-transitory computer-readable storage medium refers to any type of physical memory on which information or data readable by a processor may be stored. Examples include random access memory, read-only memory, volatile memory, nonvolatile memory, hard drives, solid state drives, compact disc read only memory, digital video discs, flash drives, disks, and any other known physical storage medium.

As referred to herein, a "memory" may comprise any type of computer-readable storage medium unless otherwise specified. A computer-readable storage medium may store instructions for execution by a processor, including instructions for causing the processor to perform steps or stages consistent with an embodiment herein. Additionally, one or more computer-readable storage mediums may be utilized in implementing a computer-implemented method. The term "computer-readable storage medium" should be understood to exclude carrier waves and transitory signals. Additionally, although "mastering" may be used as an example throughout, it is understood that the following description applies to other forms of audio production and/or audio processing, such as mixing, recording, pre-recording, and other forms of post-production.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

During audio processing, a representation of audio can be manipulated, altered, or enhanced either in the digital domain or in the analog domain. A digital signal suitable for processing in the digital domain, one example of which is a digital audio file, comprises a series of ones and zeros that can be converted into an analog sound wave defining aural audio. By contrast, an analog signal suitable for processing in the analog domain comprises a time-varying electrical signal that can drive a driver, such as a loud speaker, to create an analog sound wave.

Manipulation in the digital domain involves processing the ones and zeros of a digital signal. By contrast, manipulation in the analog domain involves passing the analog signal through one or more analog signal processors. Such processing components can include resistors, capacitors, inductors, operational amplifier, vacuum tubes, transistors, and other analog components. Whereas analog signal processors comprise physical components, a digital signal processors can be reduced a set of instructions executed by a processor, such as a plug-in that operates within a digital audio workstation.

Modern recording studios frequently record audio in the digital domain. While some studios still use analog devices such as audio tapes, most studios employ digital recording devices because storage, transmission, copying, and sharing a digital recording is far simpler than with an audio tape. Illustrating by example, a studio may record a recording in the digital domain and save it as a .WAV file. After the recording, the .WAV file will need to be mastered.

Mastering can take place entirely in the digital domain. For example, in environments where cost is a factor, some or all of the audio production process may be carried out digitally through the use of plugins and software, some of which may attempt to model the characteristics of physical analog equipment. However, as noted above, many artists, audiophiles, and purists prefer mastering in the analog domain due to the superior acoustic characteristics that result in the final mix. To accomplish audio mastering from a digital file, the digital audio must be converted to analog audio and manipulated with analog audio components. Analog mastering provides a more pleasing and rich sound due to the way that audio signal processors raise or lower levels for particular tracks, add effects, add equalization, add compression, and so forth to manipulate audio signals. The end goal of the mastering process is to create a master version of the enhanced audio that can be used to replicate and/or distribute the audio.

Mastering and mixing engineers and/or home users almost always need to apply corrective equalization and/or dynamics processing such as compression and/or limiting to improve sound translation and loudness to ensure proper fidelity on all playback systems. When processing audio, dynamics processing, e.g., dynamic compression or limiting, is used to increase the volume of the recorded audio to two or three times the original volume so that the volume level can be competitive with that of other music in the market for sale. Achieving competitive volume levels is important so that the mastered song is not perceived as quieter and/or less energetic than other songs played on a listener's sound system. However, this type of dynamic enhancement usually flattens the volume levels and dynamic changes in the audio, removing fluctuation in dynamics (loud parts vs. quiet parts) so that the listener is less able to distinguish volume changes in the music and the impact of dynamic instruments like drums. This type of compression and limiting is very common and the increases in levels can also cause audible distortion in the music.

In addition to audio professionals such as mastering engineers, mixers, mixers for film, audio engineers, audio producers, recording studio engineers, studio musicians, home enthusiasts, and hobbyists frequently have a need for mastering services. Illustrating by example, some people record, mix, remix, master, and/or otherwise produce audio, such as music, as a hobby. Other people are stereo enthusiasts or audiophiles who use hardware and/or software to digitally process "finished" audio to achieve a better listening experience. However, these hobbyists and at-home enthusiasts are often limited by their lack of training and the expense required to purchase professional-level analog equipment for achieving commercial-level loudness without destroying dynamics and/or introducing distortion.

Advantageously, embodiments of the disclosure provide a remote system by which users may not only master files in the analog domain, but also control the analog boards and analog signal processors to make adjustments in accordance with their desired preferences. In short, embodiments of the disclosure allow users to remotely access the expensive and complex analog signal processing devices of an analog master's highly controlled studio, and in particular, to control those analog signal processing devices to master content from a computer, tablet, or phone without having to travel to the studio.

Embodiments of the disclosure allow remote, analog, audio mastering from a client device that is interfaced across a network with a server complex. A user employing a user interface at a client terminal can provide one or more analog domain control settings from the client terminal to control settings and other adjustments on one or more analog signal processors located across the network to master files in the analog domain. Using embodiments of the disclosure, a user can change the settings on analog—as well as digital—equipment remotely. Parameters such as input level, output level, equalization, compression, and other settings of analog or digital equipment can be adjusted using the client device, which is located remotely from the server complex and analog signal processing equipment.

In one or more embodiments, a server complex is in communication with a network, such as the Internet. A remote device, which may be a computer, a tablet, a smartphone, or other device, receives a user interface presentation from the server complex. The user interface can include one or more analog domain control settings, one or more digital domain control settings, and a network upload portal. Using the user interface, the user can set the analog domain control settings and/or digital domain control settings to the desired level. Additionally, the user can upload a digital audio file through the network upload portal.

The server complex, which is in communication with the remote device across the network, then receives the digital audio file, the one or more analog domain control settings and/or the one or more digital domain control settings. Using analog signal processing as an example, the server complex then employs a digital-to-analog converter to convert the digital audio file to an analog signal. A control device, which is operable with one or more analog signal processors, then applies setting adjustments to the one or more analog signal processors in accordance with the one or more analog domain control settings received from the remote device.

The one or more analog signal processors then apply at least one dynamic analog modification to the analog signal. As the analog signal processors have been configured in accordance with the one or more control signals, the at least one dynamic analog modification is applied in accordance with the one or more analog domain control settings received from the remote device. The application of the one or more dynamic analog modifications results in a conversion of the analog signal to a modified analog signal. An analog-to-digital converter then converts the modified analog signal to a modified digital audio file.

The server complex can then share the modified digital audio file with the user. For example, in one embodiment the server delivers a download portal, which facilitates download of the modified digital audio file to the remote device across the network. Advantageously, the user need never visit the studio or physically touch the analog signal processors to control them as desired to master audio files in the analog domain.

Embodiments of the disclosure use various systems and methods for processing audio. In one embodiment, a system comprises a processor of a server complex that plays a digital audio file. In one embodiment, a digital-to-analog converter converts the digital audio into an analog signal (representing analog audio) while the digital audio is playing.

The digital audio file may contain metadata specifying a first clock frequency for normal playback. In some embodiments, while playing the digital audio file, the processor may optionally play the digital audio file at a second clock frequency that is different from, i.e., higher or lower, than the first, i.e., normal, clock frequency. This results in faster than normal playback, and as will be described in more detail below, can be used to further augment the mastering process. However, it should be noted that this adjustment of frequency is optional and in many embodiments will be omitted. Where frequency adjustment is optionally used, it may raise the low frequency information to become higher frequency information of the digital audio file during playback, as compared to playback at the first clock frequency.

Regardless of whether clock frequency adjustment is employed, in one or more embodiments the system then passes the analog signal through one or more analog signal processors to manipulate at least one sound characteristic of the analog audio. For example, the one or more analog signal processors may contain components for compressing, limiting, and/or making equalization adjustments to the analog audio.

In one or more embodiments, a mixing console or other settings controller is operable to control the one or more analog signal processors. The mixing console includes potentiometers and other controls for combining, routing, and altering analog signals. The mixing console can adjust settings of the one or more analog signal processors to change the volume level of the analog signal, the timber of the analog signal, or the dynamics of the analog signal. The mixing console can also adjust the settings of the one or more analog signal processors to combine or split the analog signals, such as from or to different tracks, as well. The mixing console can control the one or more analog signal processors to modify analog signals with one or more of compression, limiting, or equalization.

In one or more embodiments a control device, which can be any of a robotic arm, one or more digitally controlled relays, one or more voltage controlled filters, one or more digitally controlled servo-driven potentiometers, one or more digitally controlled servo-driven attenuators, one or more digitally controlled voltage controlled amplifiers, one or more digitally controlled variable gain amplifiers, or combinations thereof, are operable to apply received analog domain control settings to the mixing console. For example, if a user uploading a song into a web portal wants increased compression, they can indicate this by transmitting analog domain control settings to the server complex. Where the control device is a robotic arm, the robotic arm can adjust the knobs, sliders, and/or potentiometers to apply the increased compression settings to the analog signal processors. Advantageously, this allows the user to control the mixing console and its corresponding analog equipment remotely.

Upon passing through the analog circuit, the system may route the manipulated analog signal to an analog-to-digital converter. The analog-to-digital converter may then convert the manipulated analog signal into a manipulated digital audio file, which is stored on a computer-readable storage medium. Where the optional clock frequency modification described above was included, the processor may then change the clock frequency associated with the modified digital audio file back to the first, i.e., original and normal, clock frequency, for normal playback. Where employed, this can lower the frequency range of the modified digital audio file to frequencies representative of the original digital audio file. However, as noted above, clock frequency adjustment is optional and will not be included in one or more embodiments.

In one or more embodiments, the audio processing is carried out across multiple workstations and/or processors. For example, a server complex may include a first workstation to output the digital audio file to the one or more analog signal processors, which in turn outputs an analog signal modified in accordance with received analog domain control parameters to a second workstation. The second workstation may then convert the modified analog signal into a modified digital audio file. This may be thought of as a "pitch and catch" arrangement. In other embodiments, the server complex may be simpler in structure. For example, rather than having two workstations, a single workstation may include multiple outputs and/or inputs to convert a digital file to an analog signal, deliver the analog signal to the one or more analog signal processors, and then receive the modified analog signal back from the analog signal processors. Other configurations of the server complex will be obvious to those of ordinary skill in the art having the benefit of this disclosure. It is to be understood that both the foregoing general description and the following detailed description are exemplary and explanatory only and are not restrictive of the embodiments, as claimed.

Turning now to FIG. 1, illustrated therein is one audio processing system 100 configured in accordance with one or more embodiments of the disclosure. The audio processing system comprises a remote device, i.e., a client device 101, which is in communication with a server complex 102 across a network 103. In one embodiment, the network 103 is the Internet. The client device 101 can take any of a variety of forms, including computers, tablet computers, smartphones, and other devices. Illustrating by example, in one embodiment the client device 101 comprises a tablet computer running a web browser to access a user interface 110. Advantageously, in one or more embodiments the user interface 110 of the audio processing system 100 allows a user to control one or more analog signal processors 105,106 remotely, across the network 103, to master a digital audio file 104 in the analog domain.

The server complex 102 can include one or more of computers, workstations, servers, and/or other devices. In FIG. 1, the server complex 102 is shown has having only a single server 107 for brevity. However, one or more intermediate servers can be disposed between the single server 107 and the client device 101. Additionally, as will be described in more detail with reference to FIG. 6 below, in other embodiments one or more cloud-based devices can be disposed between the server complex 102 and the client device 101. The single server 107 of the server complex 102 can even be a cloud-based device. Other configurations of the server complex 102 will be obvious to those of ordinary skill in the art having the benefit of this disclosure.

In one or more embodiments, the server complex includes a first digital audio workstation 108 and a second digital audio workstation 109. The first digital audio workstation 108 and the second digital audio workstation 109 of this embodiment are disposed to either side of one or more analog signal processors 105,106. The first digital audio workstation 108, the one or more analog signal processors 105,106, and the second digital audio workstation 109 work in tandem to carry out audio processing. In this example, the components of the server complex 102 are split into a digital domain, e.g., signals processed by either the first digital audio workstation 108 and a second digital audio workstation 109, and analog domain, e.g., signals processed by the one or more analog signal processors 105,106.

The server complex 102 provides users with access to the mastering components, e.g., the first digital audio workstation 108, the one or more analog signal processors 105,106, and the second digital audio workstation 109 across the network 103. In one embodiment, the server complex 102 delivers a user interface 110 for presentation on the client device 101.

In one or more embodiments, the user interface 110 is operable to receive one or more analog domain control settings 111 that are used to control the one or more analog signal processors 105,106 and/or the first digital audio workstation 108 and the second digital audio workstation 109. For instance, in this illustrative example the user interface 110 comprises a loudness level selection tool 112 defining a loudness level 113 associated with a digital audio file 104.

In one or more embodiments, the user interface 110 is also operable to receive the digital audio file 104. In this illustrative embodiment, the user interface 110 also comprises a network upload portal 114 through which the server complex 102 can receive an upload 115 of the digital audio file 104 through the network upload portal 114.

When a user wishes to master a digital audio file 104 in the analog domain, they simply navigate to the user interface 110. For example, in one embodiment the user launches a web browser on the client device 101 to navigate to the user interface 110. Once at the user interface 110, the user may enter identifying information, such as their name and digital audio file title. The user can also upload 115 the digital audio file 104 to the server complex 102 using the network upload portal 114.

In one or more embodiments, the user also establishes one or more analog domain control settings 111 that will be used in the analog domain during the mastering. In this simple example, the user selects a loudness level 113 associated with a digital audio file 104 using the loudness level selection tool 112. The options presented in this example are (1) Moderate loudness level, which is good for dynamic mixes and acoustic songs, (2) Loud loudness level, which is suitable for standard mixes with moderate compression, (3) Louder loudness level, which is suitable for well balanced mixes that are well compressed, and (4) a Loud/Safe loudness level, which is suitable for ballads and softer songs that need to be louder. In this illustrative embodiment, the loud loudness level is the default value, and also happens to be the selected loudness level 116 of the user. When the digital audio file 104 is uploaded, so too are the one or more analog domain control settings 111.

The server complex 102 then receives the digital audio file 104 and the one or more analog domain control settings 111 from the client device 101 across the network 103. In this illustrative example, the server complex 102 includes a first digital audio workstation 108 that stores the received digital audio file 104, and optionally the one or more analog domain control settings 111. Alternatively, the server 107 stores the one or more analog domain control settings. The digital audio workstation 108 can comprise at least one processor and a memory or other computer readable storage medium. In one embodiment, the digital audio workstation 108 is a stand-alone device built specifically for handling audio production, mixing, and/or processing. For example, the digital audio workstation 108 may have an integrated mixer, audio sequencer, and/or effects capabilities. In another embodiment, the digital audio workstation 108 can comprise a personal computer with software being executed by a processor for the purpose of audio production, recording, mixing, and/or mastering.

The digital audio file 104 can be received by the server complex 102 in any of a variety of formats, including .WAV, .AIFF, SDII, AC3, DSD, or other audio file formats. For example, the digital audio file 104 shown in FIG. 1 is a .WAV file, which is compatible with the Windows™ operating system and typically contains non-compressed audio information. This means that the digital audio file 104 can be a relatively large file that contains all recorded audio information. However, other file types are possible. For example, the digital audio file 104 can even include a video file type, such as .AVI, to the extent that the video file type includes an audio track or portion.

The digital audio file 104 may also contain metadata 117 that specifies characteristics of the digital audio file 104, such as the bit rate and the sample rate. Other characteristics can also be identified in the metadata 117 as well. For example, .WAV files contain a header that can indicate surround sound and speaker positions, provide information regarding sample types, and supports defining custom extensions to the format chunk. The sample rate may indicate the number of samples per second used in a digital representation of an analog signal. The bit rate may indicate the number of bits used to represent the level of the sample. In theory, the higher the sample rate and bit rate, the closer a discrete digital audio file represents the continuous analog audio signal that it emulates.

In one or more embodiments, the first digital audio workstation 108 comprises a digital-to-analog converter 118. The digital-to-analog converter 118 can be configured as a sound card of the first digital audio workstation 108 in one embodiment. In another embodiment, the digital-to-analog converter 118 can be configured as a standalone component located externally to, but operable with, the first digital audio workstation 108.

The digital-to-analog converter 118 can receive the digital audio file 104 from the server 107 of the server complex 102 and can convert the digital audio file 104 to an analog signal 119. In this example, the first digital audio workstation 108 may convert the digital audio file 104 into an analog signal 119 and send the analog signal 119 to the one or more analog signal processors 105,106 for processing. It is understood that this conversion can utilize an external converter in one embodiment.

In one or more embodiments, a control device 120 is operable to control the one or more analog signal processors 105,106. As will be described in subsequent figures below, the control device 120 can take a variety of forms, including one or more of a robotic arm, digitally controlled relays, voltage controlled filters, digitally controlled servo-driven potentiometers, digitally controlled servo-driven attenuators, digitally controlled voltage controlled amplifiers, digitally controlled variable gain amplifiers, or combinations thereof. Other control devices suitable for controlling the one or more analog signal processors 105,106 will be obvious to those of ordinary skill in the art having the benefit of this disclosure.

The control device 120 receives the one or more analog domain control settings 111 from the server 107 of the server complex 102 or the first digital audio workstation 108, and applies them to the one or more analog signal processors 105,106. Illustrating by example, if the one or more analog signal processors 105,106 comprise resistors, capacitors, inductors, operational amplifier, vacuum tubes, transistors, or other analog components, as controlled by one or more mixing consoles 121,122, and the control device 120 is a robotic arm, the robotic arm can adjust the knobs, sliders, and other controls of the mixing consoles 121,122 to apply setting adjustments to adjust the same to configure the one or more analog signal processors 105,106 in accordance with the one or more analog domain control settings 111 received from the client device 101.

In one or more embodiments, once the digital audio file 104 is converted to the analog signal 119, it is delivered from the first digital audio workstation 108 to the one or more analog signal processors 105,106. The one or more analog signal processors 105,106 receive the analog signal 119 from the digital-to-analog converter 118 and apply at least one dynamic analog modification 181 to the analog signal 119 in accordance with the one or more analog domain control settings 111 received from the client device 101 (since the control device 120 has set the mixing consoles 121,122 in accordance with the one or more analog domain control settings 111 to the analog signal 119 to obtain modified analog signal 123.

Figure 2:
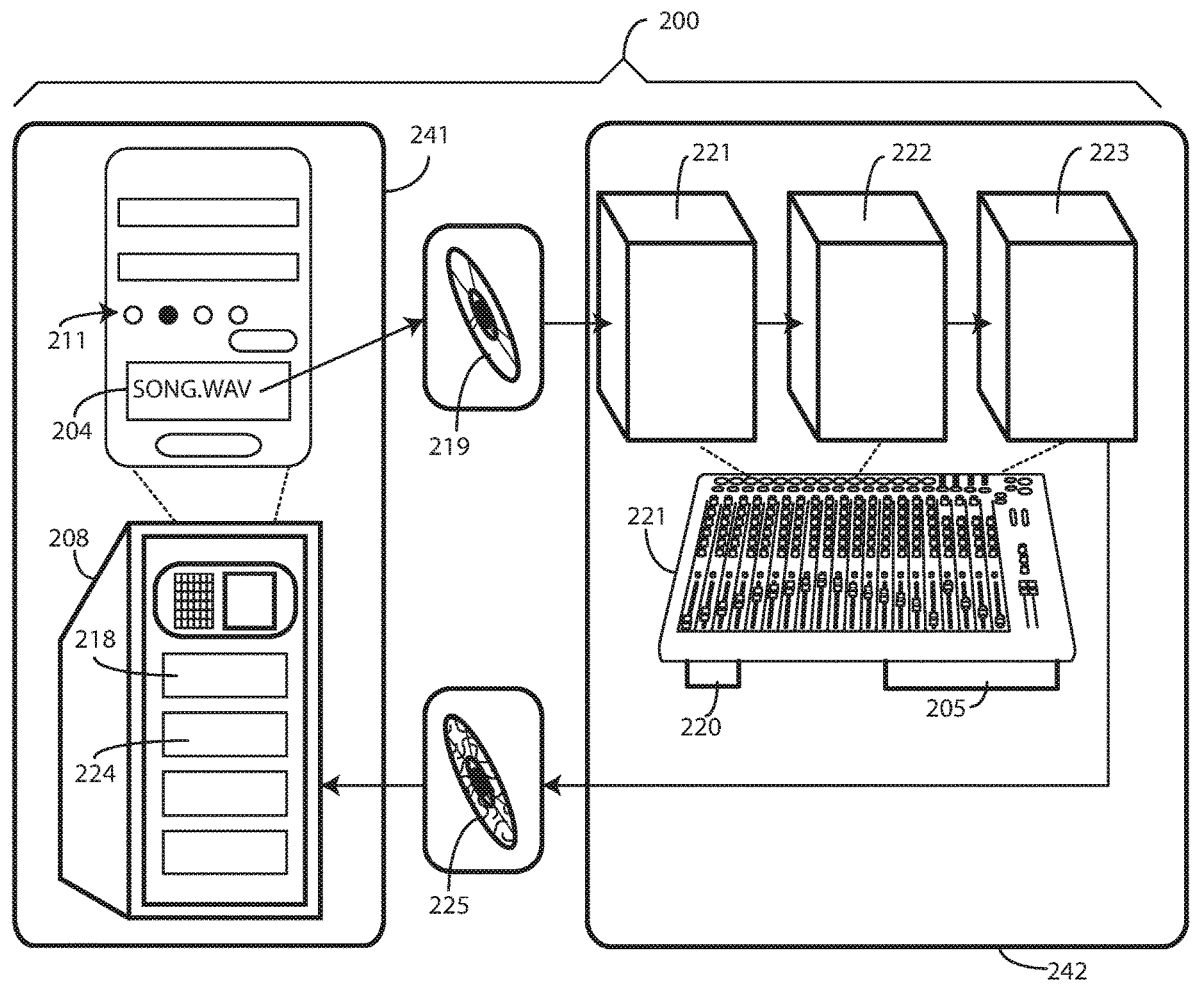
FIG. 2 illustrates one alternate server complex in accordance with one or more embodiments of the disclosure.

The dynamic modifications or effects applied by the one or more analog signal processors 105,106 may include at least one of compression, limiting, and equalization. In some embodiments, additional effects are possible, such as stereo field effects, exciter effects, tape emulation effects, etc. In order to apply these effects, one or more analog signal processors 105,106 one or more hardware modules. (Examples of such hardware modules, integrated into the analog signal processors 105,106 of FIG. 1, are shown in FIG. 2 as modules 221,222,223.) The modules may comprise any known combination of circuitry and analog components for applying compression, limiting, and/or equalization, depending on the dynamic effect applied by the particular module.

Additionally, each of the modules may be connected to one another in an effects chain in one embodiment. In an effects chain, the output from one module can serve as an input for another module. For example, a compressor module (221) may output a modified analog signal that is received as an input at a limiter module (222). The output of limiter module (222) may then be received as an input of equalization module (223).

The compressor module (221) is used to compress the dynamic range of the analog signal 119. This type of compression is distinct from data compression, in which the information is optimized for a smaller file size. In dynamic range compression, quiet sounds can be made louder by reducing the dynamic range of loudness and amplifying the quiet sounds.

The type of compression applied may vary between embodiments. For example, a peak sensing compressor may respond to an instantaneous level of the input signal. This type of compression may provide tighter peak control, but can yield very quick changes in gain reduction, which under traditional audio processing methods can lead to audible distortion. Alternatively, an averaging compressor may be used to apply an averaging function (such as root mean squared ("RMS")) on the input signal before its level is compared to the threshold. Some compressors may include controls or inputs to set a compression ratio, which typically determines the reduction of signal loudness, and a gain level to increase the loudness of the audio signal. Other controls, such as attack, release, and knee control may be provided to help shape the compression. The attack may determine the period when the compressor decreases gain to reach the level governed by the ratio. The release may determine the period when the compressor is increasing gain to the level governed by the ratio, or, to zero dB, once the level has fallen below the threshold. The length of each period may be determined by the rate of change and the required change in gain. In one embodiment, the attack and release times are adjustable by the user. In another embodiment, the attack and release times determined by the circuit design and cannot be adjusted by the user.

A limiter module (222) may receive a modified analog signal from compressor module (221). Limiting, as provided by the limiter module (222), is technically another form of compression that includes a very high compression ratio. For example, a compression ratio between 60:1 and .infin.:1 may be used in limiting. The purpose of limiting is generally to keep the analog signal 119 level below 0 dB, to avoid "clipping." Audio engineers and producers typically try to avoid clipping because clipping results in a harsh and typically undesirable audio artifact. In an alternate embodiment, limiting is not applied because the converters effectively limit the audio signal when the low-frequency information is no longer present.

With prior systems, if limiting is relied on too heavily to reduce audio levels, overload and distortion can occur. For example, when the signal processed by the limiter is consistently far above 0 dB, the amount of compression applied by the limiter can cause distortion for similar reasons as explained above with regard to compressors. Advantageously, by being able to remotely control the one or more analog signal processors 105,106 remotely with the one or more analog domain control settings 111, this overload and distortion can be avoided without the need of traveling to the studio.

An equalization module (223) may apply equalization to the analog signal 119. Equalization may alter the frequency response of the audio signal, amplifying some frequencies and/or reducing some frequencies. This can be used, for example, to emphasize different frequencies across the stereo field to make particular sounds, instruments, and/or voices stand out in an audio mix. However, analog equalization hardware, particularly cheap equalization hardware commonly found in home studios, can introduce distortion in the low frequencies if the audio signal is too loud for the equalizer to handle. Advantageously, by being able to remotely control the one or more analog signal processors 105,106 remotely with the one or more analog domain control settings 111, this overload and distortion can be avoided without the need of traveling to the studio. Note that while in this example compression is provided first, then limiting, and then equalization, effects may also be provided in other orders. For example, equalization may be applied before any compression in another embodiment.

In this illustrative embodiment, the server complex 102 also includes a second digital audio workstation 109. In one embodiment, the second digital audio workstation 109 comprises an analog-to-digital converter 124. After the one or more analog signal processors 105,106 apply the dynamic analog modification(s) to the analog signal 119 in accordance with the one or more analog domain control settings 111 received from the client device 101 across the network 103 to create the modified analog signal 123, the analog-to-digital converter 124 converts the modified analog signal 123 into a modified digital audio file 125.

In one or more embodiments, the modified digital audio file 125 is then stored in a memory device or other non-transitory computer-readable storage medium at the second digital audio workstation 109. Examples of such a memory or non-transitory computer-readable storage medium include a disk drive or some other storage medium. However, in another embodiment, the memory or other non-transitory computer-readable storage medium is located on a separate product or workstation from the second digital audio workstation 109, either in the cloud or within the server complex 102. One example of such a separate device would be server 107.

In one or more embodiments, the server complex 102 presents a network download portal 126 facilitating download of the modified digital audio file 125 across the network 103. Using the network download portal 126, the user can download the modified digital audio file 125 to the client device 101 or another storage medium. Accordingly without ever visiting the server complex 102 or its associated studio, the user is able to master the digital audio file 104, using their own prescribed settings for the one or more analog signal processors 105,106. Prior art systems are simply unable to allow such remote control of analog components.

In one or more embodiments, the server complex 102 includes components that synchronize delivery of the analog signal 119 to the one or more analog signal processors 105,106 and receipt of the modified analog signal 123 from the one or more analog signal processors 105,106. One reason such synchronization may be required is due to the fact that digital files are non-transitory, while audio signals are transitory. Accordingly, when an audio signal is delivered to the one or more analog signal processors 105,106, it passes therethrough without storage. Where a first digital audio workstation 108 and a second digital audio workstation 109 are included, synchronization may be required to alert, for example, the second digital audio workstation 109 that the first digital audio workstation 108 is delivering the analog signal 119 to the one or more analog signal processors 105,106 so that the second digital audio workstation 109 can listen to receive the modified analog signal 123.

In this illustrative embodiment, the server 107 of the server complex 102 is operable to synchronize delivery of the analog signal 119 to the one or more analog signal processors 105,106 and the conversion of the analog signal 119 to the modified digital audio file 125. First digital audio workstation 108 is referred to as the "pitch" workstation, while the second digital audio workstation 109 is referred to as the "catch" workstation. This is the convention because "pitch" pitches the analog signal 119 to the one or more analog signal processors 105,106, while "catch" catches the modified analog signal 123 from the one or more analog signal processors 105,106.

In one or more embodiments, server 107 synchronizes pitch and catch by actuating the analog-to-digital converter 124 of catch when the digital-to-analog converter 118 of pitch delivers the analog signal 119 to the one or more analog signal processors 105,106. This allows catch to receive the modified analog signal 123 as it is output from the one or more analog signal processors 105,106. Thus, in one or more embodiments the server complex 102 causes a concurrent initiation of a conversion of the digital audio file 104 to the analog signal 119 at the first digital audio workstation 108 to deliver the analog signal 119 to the one or more analog signal processors 105,106 and conversion of the modified analog signal 123 at the second digital audio workstation 109 to a modified digital audio file 125 after the application of the at least one dynamic analog modification 181.

In one or more embodiments, prior to applying the dynamic analog modification 181 to the analog signal 119, the sample rate of the digital audio file 104 can be converted to a predefined or standard sample rate. Such a technique is described in copending U.S. application Ser. No. 14/224,009, entitled, "Systems and Methods for Dynamic Audio Processing," filed Mar. 24, 2014, which is incorporated herein by reference for all purposes. The sample rate may indicate the number of samples per second used in a digital representation of an analog signal. The bit rate may indicate the number of bits used to represent the level of the sample. In theory, the higher the sample rate and bit rate, the closer a discrete digital audio file represents the continuous analog audio signal that it emulates.

It is known that the normal playback or recording frequency, referred to as a "sample rate" in the digital domain, can vary between different digital audio files. The playback frequency can be identified in the metadata 117 as the sample rate associated with the digital audio file 104. For example, the standard sample rate, i.e., normal playback frequency, used for digital audio files on audio compact discs is 44,100 samples per second (44.1 kHz), with 16 bits of information per sample. Digital Video Discs on the other hand, contain digital audio files with a sample rate of 48 kHz and 24 bits of information per sample.

Audio and music files can be recorded at a variety of different sample rates. Each different sample rate results in a different normal playback frequency. For example, some professional audio hardware provides the option for sample rates of 88.2 kHz, 96 kHz, and/or 192 kHz. Even though standard audio gear and related applications tend to call for digital audio files with 44.1 kHz or 48 kHz sample rates, higher sample rates can be useful in audio recording applications where effects are applied to ensure that the modified source information is as close to the original analog signal, e.g., the signal generated by pressure on a microphone diaphragm, as possible.

Accordingly, in one or more embodiments the first digital audio workstation 108 will adjust the effective sample rate of the digital audio file to a predefined rate by changing the metadata. This is different from resampling. By changing the metadata, audio equipment processing the file believes the file to be recorded at one sample rate, i.e., by reading the metadata, when the file was actually recorded at a different sample rate. Accordingly, when the equipment processes that file, the audio characteristics will change from their original form. For example, the song might sound faster and at a higher pitch, or alternatively slower and at a lower pitch.

Illustrating example, if the digital audio file 104 has associated therewith a sample rate of 192 kHz, as indicated by the metadata, and a sample rate of 44.1 kHz is desired, the metadata can be changed to make equipment believe that the digital audio file 104 was recorded at 44.1 kHz and not 192 kHz. When the equipment processes the digital audio file 104, it will therefore sound slower and lower. Thus, the effective sample rate can be adjusted to this lower rate by altering the metadata associated with the file, which alters the speed of playback. Similarly, if the digital audio file 104 has a sample rate of 88.2 kHz, and a sample rate of 192 kHz is desired, the first digital audio workstation 108 can convert the effective sample rate to the higher rate by changing the metadata in similar fashion. Adjusting metadata 117 is preferable to resampling at a different sample rate because the latter generally can lead to fidelity loss and are avoided by audio professionals if possible.

Additionally, in other embodiments, prior to applying the dynamic analog modification 181 to the analog signal 119, the first digital audio workstation 108 can change the clock frequency associated with the digital audio file 104. Illustrating by example, the digital audio file 11 may have metadata 117 indicating a clock frequency that should be used for normal playback to preserve the proper frequency characteristics of the music represented by the digital audio file 104. For instance, the metadata 117 may indicate a sample rate of 44.1 kHz. In one embodiment, the sample rate may also be the clock frequency that should be used for normal playback to preserve the proper frequency characteristics of the music represented by the digital audio file 104.

Even where the metadata 117 does not indicate the clock frequency, the sample rate can be extrapolated into a clock frequency to use for normal playback. For instance, because each sample of the digital audio file 104 contains multiple bits-worth of information, if the audio processing system 100 ties the clock to a particular amount of data to be processed, the actual clock frequency for playback may also depend on the bit rate, which also may be indicated by metadata 117 in the digital audio file 104. However, the sample rate indicated by metadata 117 in many systems indicates the actual clock frequency for normal playback, eliminating the need for the processor to calculate a different clock frequency for use in playback. However, either embodiment is considered to indicate a first clock frequency for a processor to use for normal playback.

In one or more embodiments, when the first digital audio workstation 108 begins to convert the digital audio file 104 with the digital-to-analog converter 118, it does so by routing informational chunks of the digital audio file 104 at a specified playback clock frequency, which may or may not be equal to the sample rate. The digital-to-analog converter then converts the informational chunks into an analog signal 119.

In one or more embodiments, the first digital audio workstation 108 may cause the digital audio file 104 to play at a second clock frequency that is different from the first clock frequency that should be used for normal playback to preserve the proper frequency characteristics of the music represented by the digital audio file 104. The second clock frequency can be higher or lower than the first clock frequency. However, in one or more embodiments the second clock frequency is greater than the first clock frequency. Illustrating by example, in one or more embodiments the first digital audio workstation 108 may set the metadata 117 of the digital audio file 104 to indicate a second clock frequency for playback that is double the first clock frequency. However, other combinations are possible, such as a 25 percent higher clock frequency.

Using the second clock frequency for playback that is higher than the normal clock frequency causes the digital audio file 104 to playback at a faster speed than normal. As a result, the digital audio file 104 exhibits higher frequency characteristics than when played at the normal playback frequency. It also completes playback more quickly. By doubling the clock frequency, a digital audio file with audio information up to 22,500 Hz can have audio information up to 44,100 KHz, which is far outside the range of human hearing.

In one embodiment, the second clock frequency is chosen to substantially reduce or virtually eliminate audio frequency information below 250 Hz. This low frequency information often creates a "muddy" sound and may be the cause of distortion created by digital-to-analog converters and/or analog components, such as a compressor, or digital components, such as digital audio processors. The exact clock frequency needed to raise the low frequency information above this threshold may vary depending on the source audio information. For example, if an audio file has substantial audio information at 200 Hz, a 25 percent increase in clock frequency will move that audio information to above 250 Hz. In one embodiment, the ideal clock frequency is chosen automatically by the processor, which analyzes the digital audio file to determine which clock frequency will move audible levels of audio information to above 100 Hz.

In one embodiment, the digital-to-analog converter 118 converts the digital audio into an analog audio signal while the digital audio is playing at the higher second clock frequency. Because the first digital audio workstation plays the digital audio file 104 at the higher second clock frequency, less low frequency information is passed through the converters. This reduces distortion and allows for a louder analog audio signal. Eliminating and/or reducing low frequency information also lightens the load on these components, including the analog input of the analog-to-digital converter 124, in which low-frequency information can account for significant portions of current, causing overloading and/or distortion. This results in a clearer analog signal 119.

The analog signal 119, as a result, may require less compression since it is already louder. This, in turn, also allows for maintaining dynamics in volume while still achieving commercial loudness levels. This further leads to more clarity in the digital-to-analog conversion, since lower frequencies are often the cause of the most audible distortion during the conversion process.

The clock signal used to play the digital audio file 104 at the higher second clock frequency may be generated by the first digital audio workstation 108 in one embodiment. Alternatively, a module communicatively coupled to the digital audio file 104 may be responsible for generating the clock signal in another embodiment. For example, a separate clock module may be used to reduce an effect called jitter by having the clock module supply the digital audio workstation 108 with a more accurate clock signal. Other modules, such as the digital-to-analog converter 118, may alternatively supply the clock signal to the processor.

Although the sample rate can be changed in metadata 117 to reflect the second clock frequency in one embodiment, an alternate embodiment does not alter the metadata 117. Instead, the digital audio workstation 108 may notify an external converter of the playback clock frequency to use. Or the user may select the clock frequency using the user interface 110. The external converter may not check the metadata 117 of the digital audio file, but instead will supply the clock at the frequency indicated by the digital audio workstation 108 or user. In this embodiment, after the audio has been processed, the resulting modified digital audio file may already contain the correct metadata 117 for sample rate. However, in one embodiment, the external converter must be notified to change the clock frequency back to the first frequency for normal playback.

Where changed playback frequencies are employed, once the modified analog signal 123 is output from the last effects module, the modified analog signal 123 is converted back into a modified digital audio file 125 through use of an analog-to-digital converter 124. In one or more embodiments, this conversion occurs without changing the speed of the modified digital audio file 125. In other words, the converted file initially may be set to play at the second clock frequency.

In an alternate embodiment, the analog-to-digital converter 124 may be set to change the playback clock frequency of the modified analog signal 123 as compared to the original digital audio file 104 without modifying the metadata 117. In this instance, the playback clock frequency supplied, e.g., using a crystal oscillator, by the analog-to-digital converter 124 may be changed accordingly to cause the modified digital audio file 125 to play at the same speed as the original digital audio file 104 with the second playback frequency. In one such embodiment, the external converter may not know the contents of the metadata 117 at any point in the process. In this way, no changes to the sample rate specified in metadata 117 occur in one embodiment.

Once the second digital audio file has been stored at the second digital audio workstation 109, or alternatively in the server 107, in one embodiment the metadata 117 of the modified digital audio file 125 can be changed to indicate the first clock frequency for normal playback speed. This effectively restores the frequency response of the modified digital audio file 125 heard when played, eliminating any "chipmunk effect" caused by setting the playback frequency to the second frequency prior to dynamic enhancement.

Turning now to FIG. 2, illustrated therein is an alternate audio processing system 200 configured in accordance with one or more embodiments of the disclosure. The audio processing system 200 of FIG. 1 is operable with a client device (101), just as was the audio processing system (100) of FIG. 1. The client device (101) can be in communication with a server complex 202 across a network (103). Here, the server complex 202 is shown separated into a digital domain 241 and an analog domain 242. As before, the client device (101) accesses a user interface (110) of the audio processing system 200, which allows a user to control one or more analog signal processors 205 remotely, across the network (103), to master a digital audio file 204 in the analog domain.

In this illustrative embodiment, the server complex 202 has a single digital audio workstation 208 that functions both as an audio workstation and a server. The digital audio workstation 208 is operable with the one or more analog signal processors 205. The server complex 202 provides users with access to the mastering components, e.g., the digital audio workstation 208 and the one or more analog signal processors 205 across the network (103). As before, the user interface (110) is operable to receive one or more analog domain control settings 211 that are used to control the one or more analog signal processors 205 and/or the digital audio workstation 208.

The server complex 202 then receives the digital audio file 204 and the one or more analog domain control settings 211 from the client device (101) across the network (103). The digital audio file 204 may also contain metadata (117) as previously described.

The digital audio workstation 208 comprises a digital-to-analog converter 218 and an analog-to-digital converter 224. The digital-to-analog converter 218 receives the digital audio file 204 and converts the digital audio file 204 to an analog signal 219. The digital-to-analog converter 218 then sends the analog signal 219 to the one or more analog signal processors 205,106 for processing.

A control device 220 is operable to control the one or more analog signal processors 205. The control device 220 receives the one or more analog domain control settings 211 from the digital audio workstation 208 and applies them to the one or more analog signal processors 205. The control device can adjust the knobs, sliders, and other controls of the mixing consoles to apply setting adjustments to configure the one or more analog signal processors 205 in accordance with the one or more analog domain control settings 211.

The one or more analog signal processors 205, receive the analog signal 219 from the digital-to-analog converter 218 and apply at least one dynamic analog modification to the analog signal 219 in accordance with the one or more analog domain control settings 211 to obtain modified analog signal 222. The dynamic modifications or effects applied by the one or more analog signal processors 205 may include at least one of compression, limiting, equalization, or combinations thereof.

One or more hardware modules 221,222,223 apply the compression, limiting, equalization, or combinations thereof. A compressor module 221 may output a modified analog signal that is received as an input at a limiter module 222. The output of limiter module 222 may then be received as an input of equalization module 223.

The compressor module 221 is used to compress the dynamic range of the analog signal 219. The limiter module 222 may receive a modified analog signal from compressor module 221. The equalization module 223 then applies equalization to the analog signal 219.

After the one or more analog signal processors 205,106 apply the dynamic analog modification(s) to the analog signal 219 in accordance with the one or more analog domain control settings 211, the analog-to-digital converter 224 converts the modified analog signal 223 into a modified digital audio file as previously described. The server complex 202 can present a network download portal (126) that allows a user to download the modified digital audio file across the network (103). Accordingly without ever visiting the server complex 202 or its associated studio, the user is able to master the digital audio file 204, using their own prescribed settings for the one or more analog signal processors 205. Prior art systems are simply unable to allow such remote control of analog components.

Figure 3:
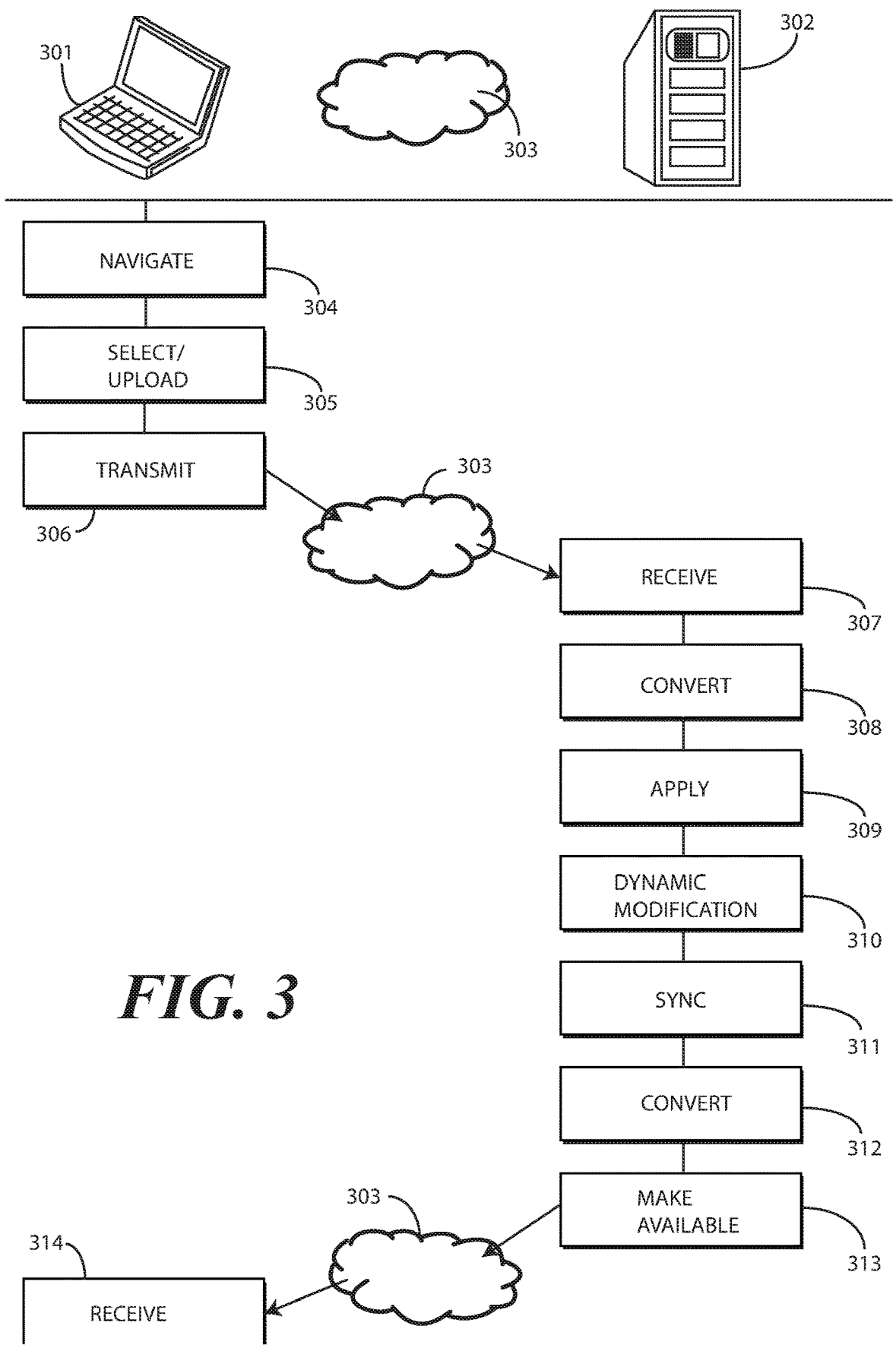
FIG. 3 illustrates one explanatory method and system in accordance with one or more embodiments of the disclosure.

Turning now to FIG. 3, illustrated therein is a system level diagram of one explanatory audio processing system 300 configured in accordance with one or more embodiments of the disclosure. As shown in FIG. 3, a remote electronic device 301 is in communication with a server complex 302 across a network 303. The remote electronic device 301 can be considered to be an "off host" computer in that it is separated from the host, i.e., the server complex 302 in this embodiment, by the network 303. In one or more embodiments, the network 303 comprises the Internet. However, other networks could be substituted for the Internet. For example, the network 303 can comprise a wide area network, local area network, ad hoc network, or other network. Still other networks will be obvious to those of ordinary skill in the art having the benefit of this disclosure.

At step 304, the remote electronic device 301 navigates to a user interface, which in one embodiment is a web portal. In one or more embodiments, the user interface includes a network upload portal receiving an upload of the digital audio file through the network upload portal At step 305, the remote electronic device 301 uses the user interface to select one or more analog domain control settings and to attach a digital audio file. The analog domain control settings could be selected via a preset selector. For instance, in the embodiment of FIG. 1 above one or more analog domain control settings were selected via a plurality of loudness indicators, each of which corresponds to one or more preset levels and controls of analog signal processing equipment.

The one or more analog domain control settings could be selected in other ways as well. For example, as will be described below with reference to FIG. 6, sliders or other level adjusters can be used to select the one or more analog domain control settings. As will be described with reference to FIG. 7, the one or more analog domain control settings could be created using a virtual representation of the studio, including a mixing console or other representation of the analog signal processors. Still other techniques for entering the analog domain control settings will be obvious to those of ordinary skill in the art having the benefit of this disclosure. In one or more embodiments, the one or more analog domain control settings created at step 305 are converted to a format convenient for transmission across the network 303, such as via an Extensible Markup Language (XML) file.

At step 306, the remote electronic device 301 transmits the digital audio file and the one or more analog domain control settings across the network 303 to the server complex 302. In one or more embodiments, the digital audio file and/or the one or more analog domain control settings may be transmitted and/or stored on one or more intermediate servers during this process. For example, one or more "cloud" servers may store the digital audio file and/or the one or more analog domain control settings so that they are accessible by both the server complex 302 and the remote electronic device 301.

At step 307, the serve complex receives the digital audio file and the one or more analog domain control settings from the remote electronic device 301 across the network 303. At step 308, a digital-to-analog converter at the server complex 302 receives the digital audio file and converts the digital audio file to an analog signal. At step 309, a control device operable with one or more analog signal processors at the server complex 302 applies setting adjustments to the one or more analog signal processors in accordance with the one or more analog domain control settings received from the remote electronic device 301. Examples of control devices include robotic arms, digitally controlled relays, voltage controlled filters, digitally controlled servo-driven potentiometers, digitally controlled servo-driven attenuators, digitally controlled voltage controlled amplifiers, or digitally controlled variable gain amplifiers. Still other techniques for mechanically controlling the potentiometers, sliders, levers, and other controls of a mixing console or other control mechanism for analog signal processing circuits will be obvious to those of ordinary skill in the art.

At step 310, the one or more analog signal processors receive the analog signal from the digital-to-analog converter and apply at least one dynamic analog modification to the analog signal. In one or more embodiments, this modification occurs in accordance with the one or more analog domain control settings received from the remote electronic device 301 due to the control device applying the setting adjustments of the previous paragraph. When the analog signal processors apply the one or more dynamic analog modifications to the analog signal, this creates a modified analog audio signal. The dynamic analog modifications can include one or more of compression, limiting, or equalization. Other dynamic analog modifications will be obvious to those of ordinary skill in the art having the benefit of this disclosure.

At optional step 311, where the server complex 302 includes multiple digital audio workstations, the server complex 302 can optionally synchronize delivery of the analog signal to the one or more analog processors and the conversion of the analog signal to the modified digital audio file. At step 312, an analog-to-digital converter of the server complex 302 converts the modified analog audio signal to a modified digital audio file. This optional step 312 can include initiation of a conversion of the digital audio file to the analog signal at the first digital audio workstation to deliver the analog signal to the one or more analog signal processors and conversion of the analog signal at the second digital audio workstation to a second digital audio file after the application of the at least one dynamic analog modification.

In one or more embodiments, the server complex 302 can make electronic audio signals available to the remote electronic device 301 during any of steps 307-312. Accordingly, a user at the remote electronic device 301 can listen to the manipulation of the audio corresponding to any of the digital audio file, the analog audio signal, and/or the modified digital audio file in real time. Said differently, a user at the remote electronic device 301 can aurally monitor the mastering process, as it occurs, in real time.

At step 313, the server complex 302 makes the modified digital audio file available to the remote electronic device 301. This can be done in any of a number of ways. In the simplest embodiment, the server complex 302 simply transmits the modified digital audio device to the remote electronic device 301 across the network 303. In another embodiment, the server complex 302 delivers the modified digital analog file to a cloud server that is accessible by the remote electronic device 301 and from which the remote electronic device 301 can download the modified digital audio file.

In still another embodiment, the server complex 302 makes a network download portal available to the remote electronic device 301. The network download portal facilitates download of the modified digital audio file. For example, in one embodiment the server complex 302 can email a link to the remote electronic device 301. Clicking on the link initiates download of the modified digital audio file to the remote electronic device 301 from the server complex. Still other mechanisms for making the modified digital audio file available to the remote computer will be obvious to those of ordinary skill in the art having the benefit of this disclosure.

At step 314, the remote electronic device 301 receives the modified digital audio file. Using the audio processing system 300, the remote electronic device 301 has been able to remotely control analog signal processing circuitry to perform true, high fidelity, analog mastering on an uploaded digital audio file.

Figure 4:
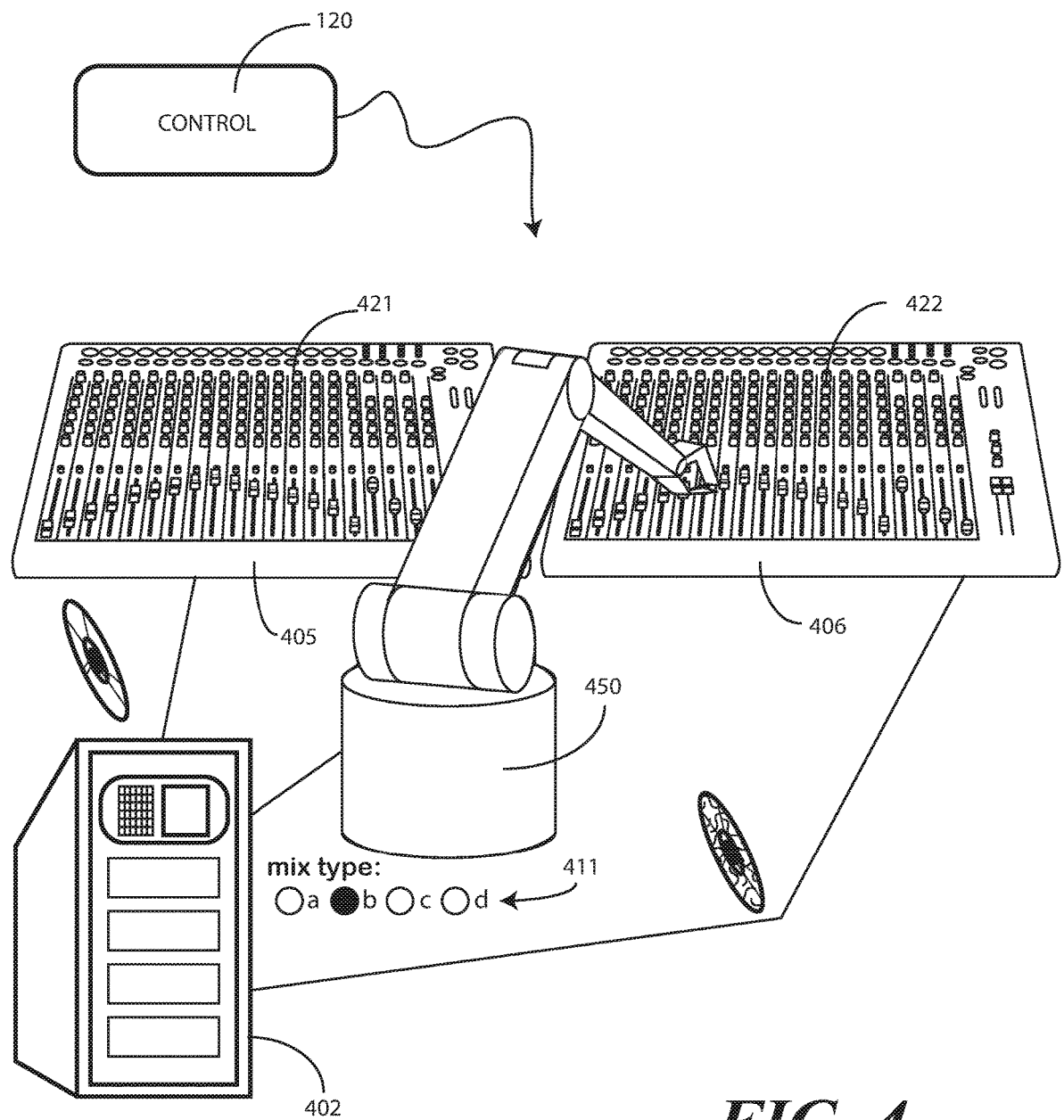
FIG. 4 illustrates one explanatory control device controlling one or more analog signal processors in accordance with one or more embodiments of the disclosure.
Figure 5:
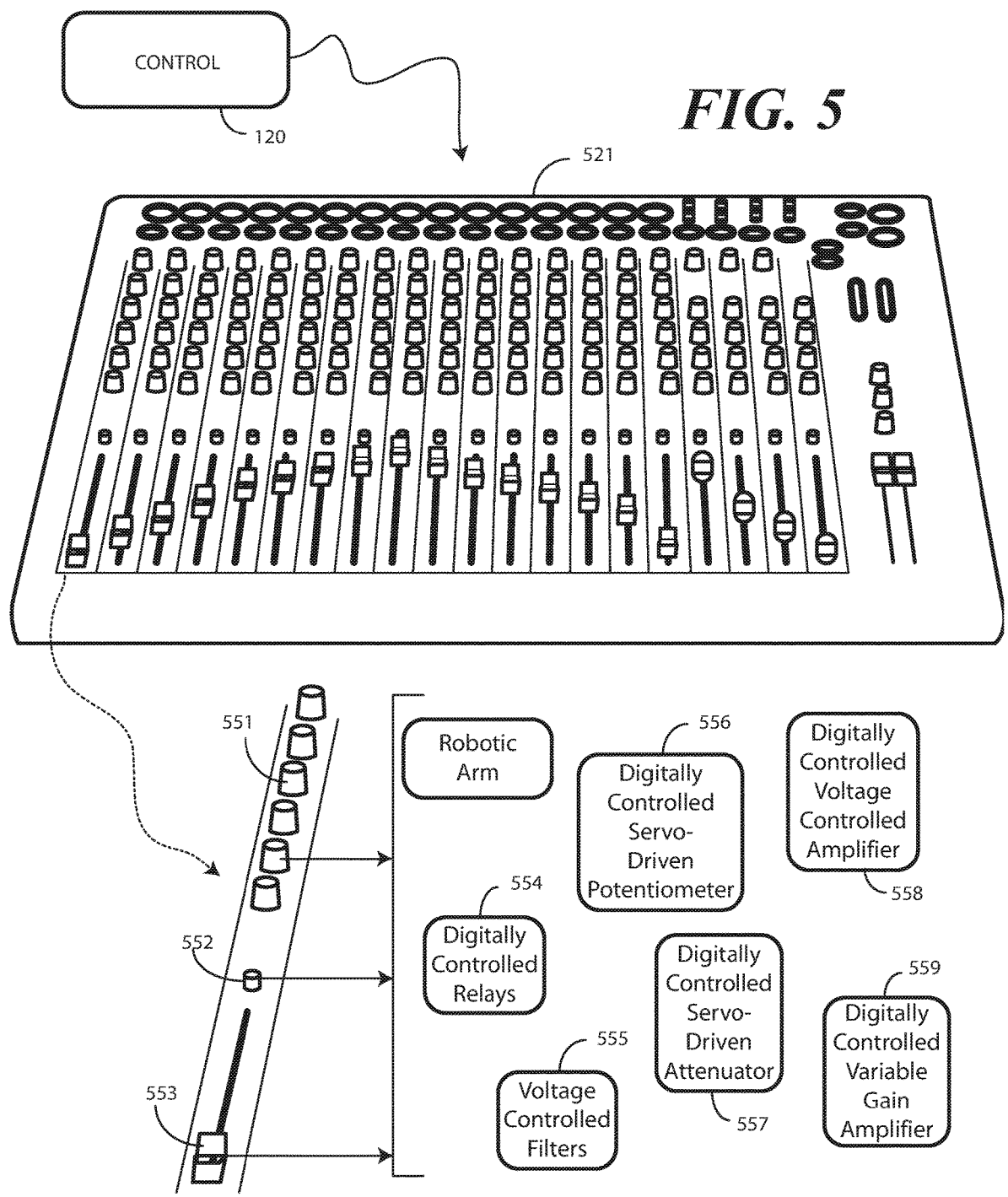
FIG. 5 illustrates additional explanatory control devices controlling one or more analog signal processors in accordance with one or more embodiments of the disclosure.

Turning now to FIGS. 4 and 5, illustrated therein are different control devices 120 suitable for use with one or more embodiments of the disclosure. Beginning with FIG. 4, illustrated therein is a server complex 402 operable with one or more analog signal processors 405,406 being controlled by mixing consoles 421,422. The mixing consoles 421,422, also known as mixing boards, the boards, the dang boards, the sound boards, or the audio mixers, allow knobs, sliders, switches, and other potentiometer-like devices to control signal levels, frequency content, dynamics, and other effects of the one or more analog signal processors 405,406. A mastering engineer adjusts these controls with their fingers while listening critically to the audio signals. However, with embodiments of the disclosure, a remote device controls the same with analog domain control settings.

The question thus becomes how to control mechanical devices with digital information. In this illustrative embodiment, a robotic arm 450 receives the analog domain control settings 411 and makes the necessary adjustments to the mixing consoles 421,422. Thus, a user can control the mixing consoles 421,422 remotely with just a few clicks of the mouse. Advantageously, they can become mastering engineers taking advantage of the expensive analog equipment of a mastering studio without having to travel to the studio. The robotic arm 450 essentially becomes a remote extension of their arm to make analog masters.

A robotic arm 450, while extremely effective, is not the only way to control the controls of the mixing consoles 421,422. Turning now to FIG. 5, illustrated therein are various other ways to control the knobs 551, sliders 552, and switches 553 of a mixing console 521.

In one embodiment, the control device 120 comprises one or more digitally controlled relays 554. In another embodiment, the control device 120 can comprise one or more voltage-controlled filters 555. In yet another embodiment, the control device 120 comprises one or more digitally controlled servo-driven potentiometers 556. In still another embodiment, the control device 120 comprises one or more digitally controlled servo-driven attenuators 557. In still another embodiment, the control device 120 comprises one or more digitally controlled voltage controlled amplifiers 558. In yet another embodiment, the control device 120 comprises one or more digitally controlled variable gain amplifiers 559. Each of these devices is able to receive a digital input and convert that digital input into analog, mechanical action, e.g., turning knobs 551, translating sliders 552, toggling switches 553, and making other adjustments to the mixing console 521. Moreover, these various control devices can be used in combination as well. Still other control devices will be obvious to those of ordinary skill in the art having the benefit of this disclosure.

Figure 6:
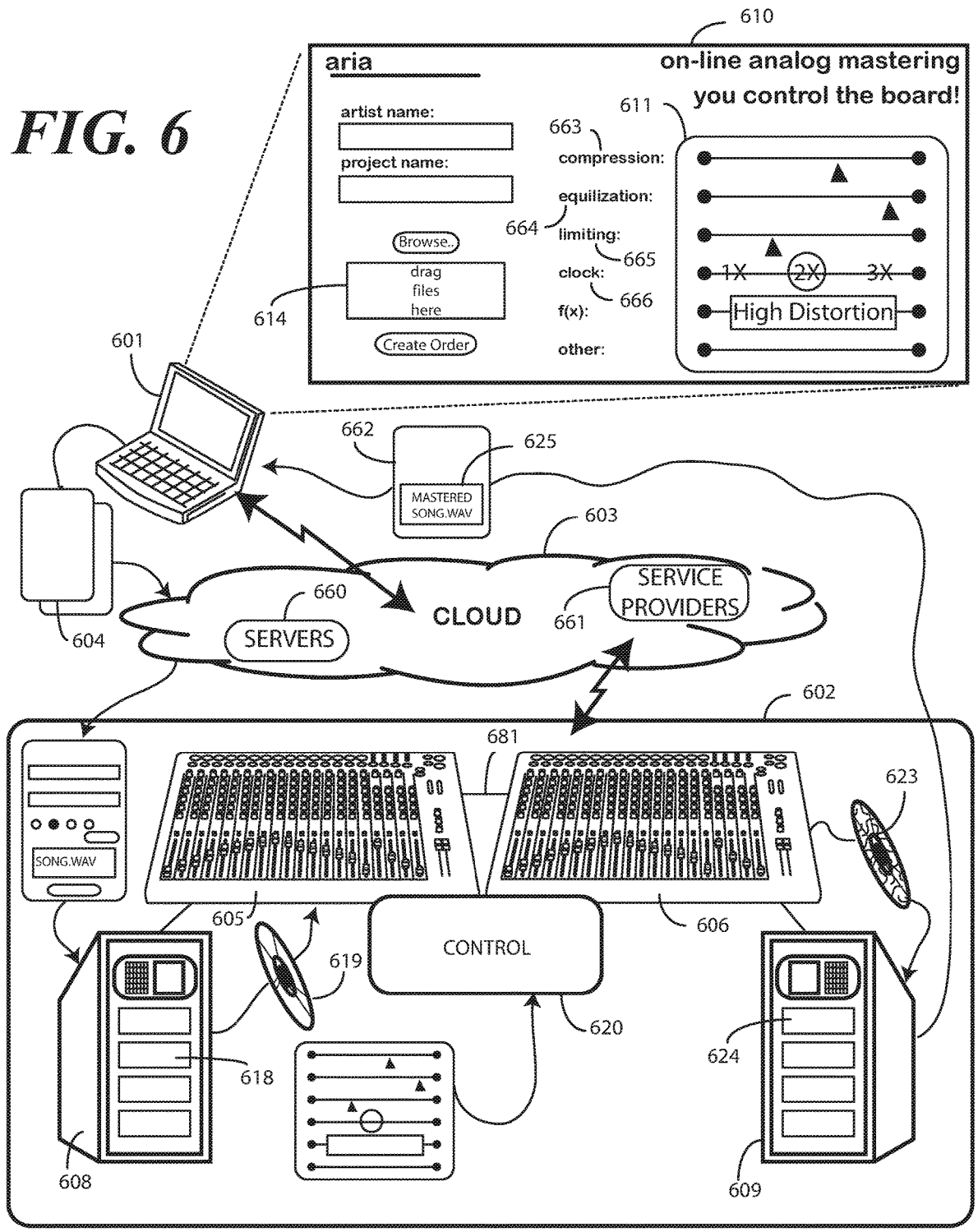
FIG. 6 illustrates another explanatory system in accordance with one or more embodiments of the disclosure.
Figure 7:
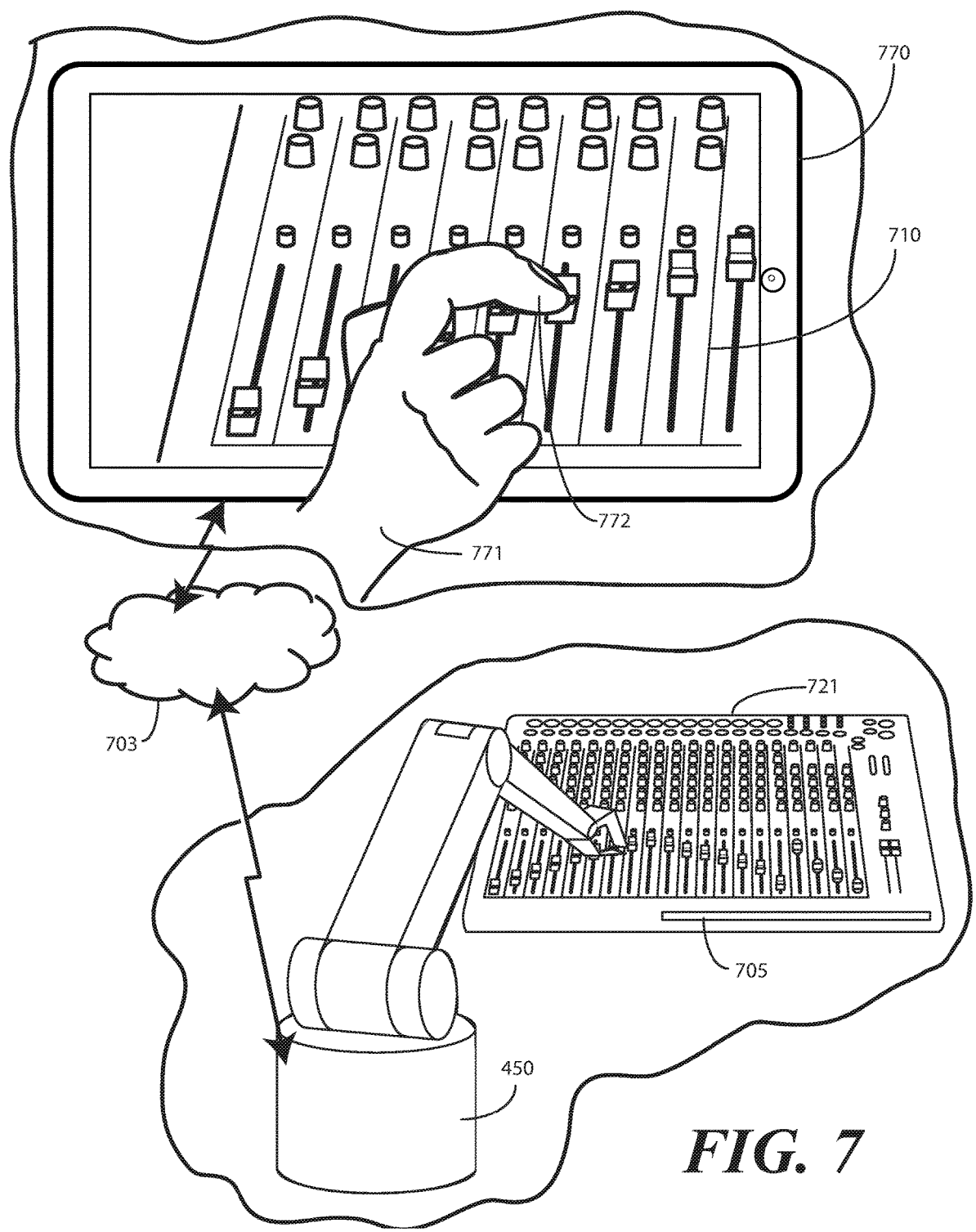
FIG. 7 illustrates another explanatory system in accordance with one or more embodiments of the disclosure.

Turning now to FIG. 6, illustrated therein is another audio processing system 600 configured in accordance with one or more embodiments of the disclosure. The audio processing system 600 comprises a client device 601 in communication with a server complex 602 across a network 603. In this illustrative embodiment, the network 603 comprises "the cloud."

The cloud, which represents one or more networked servers 660 or network-based service providers 661, can provide one or more computing services that are available to one or both of the client device 601 or the server complex 602. Illustrating by example, the one or more networked servers 660 can include a collection of computing devices, which can be located centrally or distributed, that provide cloud-based services to one or both of the client device 601 or the server complex 602 via a network 603 such as the Internet. The cloud can be used, for instance, by the server complex 602 or the client device 601 to offload various computing tasks such as processing user input, presenting user interfaces, storing data, and so forth.

The cloud can, for example, provide services such as the presentation of the user interface 610, the provision of the network upload portal 614, the client download portal 681, storage of the digital audio file 604, the modified digital audio file 625, or the one or more analog domain control settings 611. Service providers 661 can customize the screen size, display capability, file storage options, messaging, communications between the client device 601 and the server complex 602, or other services. Still other uses for the cloud and its corresponding networked servers 660 or services providers 661 will be obvious to those of ordinary skill in the art having the benefit of this disclosure.

The client device 601 initially accesses the user interface 610. In one or more embodiments, the user interface 610 is operable to receive one or more analog domain control settings 611 that are used to control the one or more analog signal processors 605,606 and/or the first digital audio workstation 608 and (where included) the second digital audio workstation 609.

In this illustrative embodiment, the one or more analog domain control settings 611 comprise a plurality of sliders by which the desired amount of compression 663, equalization 664, limiting 665, or other parameters can be controlled. Additionally, adjusters for clock frequency 666 can be included to clock the digital audio file 604 at a higher frequency while applying analog signal modifications as previously described can be provided as well.

In one or more embodiments, the user interface 610 is also operable to receive the digital audio file 604. In this illustrative embodiment, the user interface 610 also comprises a network upload portal 614 through which the server complex 602 can receive an upload of the digital audio file 604 through the network upload portal 614. In one or more embodiments, the digital audio file 604 is stored on a networked server 660 in the cloud so that it is accessible by both the client device 601 and the server complex 602.

The server complex 602 downloads the digital audio file 604 and the one or more analog domain control settings 611 form the networked servers 660 of the cloud. A digital-to-analog converter 618 converts the digital audio file 604 to an analog signal 619. A control device 120 receives the one or more analog domain control settings 611 and applies them to the one or more analog signal processors 605,606. Once the digital audio file 604 is converted to the analog signal 619, the one or more analog signal processors 605,606 apply at least one dynamic analog modification 621 to the analog signal 619 in accordance with the one or more analog domain control settings 611. The dynamic modifications or effects applied by the one or more analog signal processors 605,606 may include at least one of compression, limiting, and equalization.

After the one or more analog signal processors 605,606 apply the dynamic analog modification(s) to the analog signal 619 in accordance with the one or more analog domain control settings 611, an analog-to-digital converter 624 converts the modified analog signal 623 into a modified digital audio file 625. In one embodiment, the server complex 602 then uploads the modified digital audio file 625 to one of the networked servers 660 in the cloud for retrieval by the client device 601.

While two explanatory user interfaces have been described above with reference to FIGS. 1 and 6, it should be noted that numerous others can be used in accordance with one or more embodiments of the disclosure. For example, turning to FIG. 7, in this embodiment another user interface 710 is being presented on a tablet computer 770. In this illustrative embodiment, the user interface 710 comprises a virtual presentation of the mixing consoles 721 used to control the analog signal processors 705. Accordingly, a user 771 can pan across the mixing console 721 with their finger 772 making adjustments to the various knobs, switches, and sliders of the mixing console 721 to deliver the analog domain control settings to the mixing console 721 through the robotic arm 450. This user interface 610 allows the user 771 to control the analog signal processors 705 just as if he were in the studio, but while being remotely located across a network 703. Other user interfaces will be obvious to those of ordinary skill in the art having the benefit of this disclosure.

Figure 8:
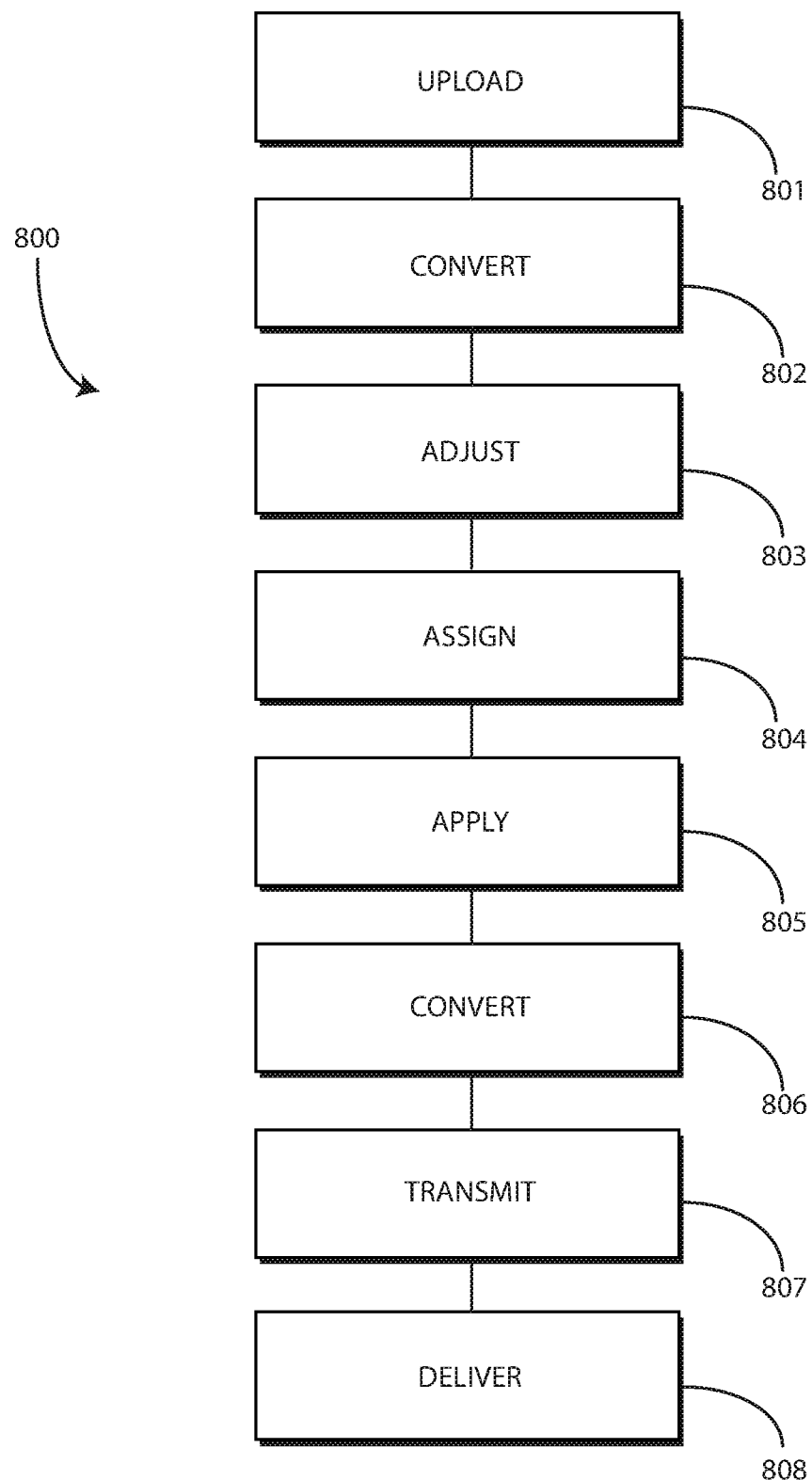
FIG. 8 illustrates one explanatory method in accordance with one or more embodiments of the disclosure.

Turning now to FIG. 8, illustrated therein is one explanatory method 800 configured in accordance with one or more embodiments of the disclosure. At step 801, the method 800 includes receiving, with a server complex in communication with a network, a digital audio file and one or more analog domain control settings. In one or more embodiments, this step 801 includes uploading, with the server complex, the digital audio file and the one or more analog domain control settings from a remote device across the network. For example, the remote device can upload the digital audio file to a cloud computer, from which the server complex can download the same.

At step 802, the method 800 includes converting, with a digital to analog converter, the digital audio file to an analog signal. At step 803, the method 800 includes adjusting one or more analog signal processors in accordance with the one or more analog domain control settings. At step optional step 804, the method 800 includes assigning, with the server complex, a clock frequency to the digital audio file that is different from a playback frequency used for normal playback as previously described.

At step 805, the method 800 includes applying, with the one or more analog signal processors, at least one dynamic analog modification to the analog signal. At step 806, the method 800 includes converting, with an analog to digital converter, the analog signal to a second digital audio file.

At optional step 807, the method 800 can include transmitting, with the server complex across the network, one or more messages identifying a mastering status of one or more of the digital audio file or the second digital audio file. For example, the method 800 may include sending one or more email messages, text messages, or other communications to the remote device to let a user know what step of the mastering process their song is presently occurring.

At step 808, the method 800 includes delivering the second digital audio file to a remote device across the network. In one or more embodiments, this includes storing the second digital audio file with a cloud computer so that the remote device can download the same.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure.

What is claimed is:

1. An audio processing system, comprising:
   a server complex in communication with a network, the server complex receiving a digital audio file and one or more analog domain control settings from a remote device across the network;
   a digital-to-analog converter receiving the digital audio file from the server complex and converting the digital audio file to an analog signal;
   one or more analog signal processors receiving the analog signal from the digital-to-analog converter and applying at least one analog modification to the analog signal in accordance with the one or more analog domain control settings received from the remote device to the analog audio to obtain a modified analog signal;
   a control device operable with the one or more analog signal processors, the control device applying setting adjustments to the one or more analog signal processors in accordance with the one or more analog domain control settings received from the remote device, the control device comprising a robotic arm; and
   an analog-to-digital converter converting the modified analog signal to a modified digital audio file.

2. The audio processing system of claim 1, the control device comprising one or more of digitally controlled relays, voltage controlled filters, digitally controlled servo-driven potentiometers, digitally controlled servo-driven attenuators, digitally controlled voltage controlled amplifiers, or digitally controlled variable gain amplifiers.

3. The audio processing system of claim 1, the at least one analog modification comprising one or more of compression, limiting, or equalization.

4. The audio processing system of claim 1, further comprising a first digital audio workstation comprising the digital-to-analog converter, the first digital audio workstation receiving the digital audio file from the server complex.

5. The audio processing system of claim 4, further comprising a second digital audio workstation comprising the analog-to-digital converter.

6. The audio processing system of claim 5, the server complex further synchronizing delivery of the analog signal to the one or more analog processors and the conversion of the analog signal to the modified digital audio file.

7. The audio processing system of claim 6, the server complex causing a concurrent:
- initiation of a conversion of the digital audio file to the analog signal at the first digital audio workstation to deliver the analog signal to the one or more analog signal processors; and
- conversion of the analog signal at the second digital audio workstation to a second digital audio file after the application of the at least one analog modification.

8. The audio processing system of claim 1, the server complex delivering a user interface for presentation on the remote device, the user interface receiving the one or more analog domain control settings.

9. The audio processing system of claim 8, the user interface comprising a loudness level selection tool defining a loudness level associated with the digital audio file.

10. The audio processing system of claim 8, the user interface comprising a virtual presentation of the one or more analog signal processors.

11. The audio processing system of claim 8, the user interface further comprising a network upload portal receiving an upload of the digital audio file through the network upload portal.

12. The audio signal processing system of claim 1, the server complex further comprising a network download portal facilitating download of the second digital audio file across the network.

13. A method, comprising:
- receiving, with a server complex in communication with a network, a digital audio file and one or more analog domain control settings;
- converting, with a digital to analog converter, the digital audio file to an analog signal;
- adjusting one or more analog signal processors in accordance with the one or more analog domain control settings;
- applying, with the one or more analog signal processors, at least one analog modification to the analog signal;
- converting, with an analog to digital converter, the analog signal to a second digital audio file after the applying;
- transmitting, with the server complex across the network, one or more messages identifying a mastering status of one or more of the digital audio file or the second digital audio file; and
- delivering the second digital audio file to a remote device across the network;
- the receiving comprising uploading, with the server complex, the digital audio file and the one or more analog domain control settings from the remote device across the network.

14. The method of claim 13, further comprising assigning, with the server complex, a clock frequency to the digital audio file that is different from a playback frequency used for normal playback prior to the applying.

15. The method of claim 13, further comprising storing one or more of the first digital audio file or the second digital audio file with a cloud computer.

16. The method of claim 13, wherein the adjusting is performed by a robotic arm.

17. The method of claim 13, further comprising delivering, to the remote device across the network, a user interface operable to receive the one or more analog domain control settings.

18. The method of claim 13, further comprising delivering, to the remote device across the network, a user interface facilitating adjustment of the one or more analog signal processors.

19. The method of claim 13, the at least one analog modification to the analog signal comprising one or more of compression, limiting, or equalization.

20. A method, comprising:
- receiving, with a server complex in communication with a network, a digital audio file and one or more analog domain control settings;
- converting, with a digital to analog converter, the digital audio file to an analog signal;
- adjusting one or more analog signal processors in accordance with the one or more analog domain control settings;
- applying, with the one or more analog signal processors, at least one analog modification to the analog signal;
- assigning, with the server complex, a clock frequency to the digital audio file that is different from a playback frequency used for normal playback prior to the applying;
- converting, with an analog to digital converter, the analog signal to a second digital audio file after the applying; and
- delivering the second digital audio file to a remote device across the network;
- the receiving comprising uploading, with the server complex, the digital audio file and the one or more analog domain control settings from a remote device across the network.

* * * * *